United States Patent [19]

Amra et al.

[11] Patent Number: 5,078,572

[45] Date of Patent: * Jan. 7, 1992

[54] MOLTEN METAL PUMP WITH FILTER

[75] Inventors: Lutfi Amra, Cleveland Heights; Ronald E. Gilbert, Chardon; George S. Mordue, Ravenna, all of Ohio

[73] Assignee: The Carborundum Company, Niagara Falls, N.Y.

[*] Notice: The portion of the term of this patent subsequent to Jul. 10, 2007 has been disclaimed.

[21] Appl. No.: 467,485

[22] Filed: Jan. 19, 1990

[51] Int. Cl.$^5$ .................................. F04D 29/70
[52] U.S. Cl. .................. 415/121.2; 75/671; 266/227
[58] Field of Search ........... 415/121.2, 201, 225; 266/227; 75/68 R, 93 R

[56] References Cited

U.S. PATENT DOCUMENTS 2,832,292  4/1958  Edwards ............... 415/170.1
3,255,702  6/1966  Gehrm .................. 415/225
4,940,384  7/1990  Amra et al. .......... 415/121.2

Primary Examiner—John T. Kwon
Attorney, Agent, or Firm—Larry W. Evans; Joseph G. Curatolo; Scott A. McCollister

[57] ABSTRACT

A molten metal pump includes a filter that prevents ingestion of foreign material such as dross from molten metal within which the pump is immersed. The filter is a large structure that is secured to the base of the pump surrounding the pump's inlet. The filter forms a cavity adjacent the pump's inlet. The filter has a low porosity while maintaining a high flow rate for the pump. The filter is a semi-toroidal structure that is attachable to a pump base having an upper inlet. The filter surrounds the pump's inlet. The filter includes a central opening through which access can be had to the pump's impeller for purposes of inspection, repair, or replacement without disturbing the attachment between the filter and base.

15 Claims, 4 Drawing Sheets

MOLTEN METAL PUMP WITH FILTER

BACKGROUND OF THE INVENTION

1. Field of the Invention

The invention relates to molten metal pumps and, more particularly, to a molten metal pump having an attached filter.

2. Description of the Prior Art

In the course of processing molten metal, it often is necessary to transfer the molten metal from one vessel to another or to circulate the molten metal within a given vessel. Molten metal pumps commonly are used for these purposes. The pumps also can be used for other purposes, such as to inject purifying gases into the molten metal being pumped. A variety of pumps as described are available from Metaullics Systems, 31935 Aurora Road, Solon, Ohio 44139, under the Model designation M12 et al.

In the particular case where molten metal is melted in a reverberatory furnace, the furnace is provided with an external well in which a pump is disposed. The pump draws molten metal from the furnace and either circulates the molten metal through the external well (from which it is re-introduced into the furnace), or it transfers the molten metal out of the well to another vessel. Typically, a thermocouple will be placed in the well in order to feed back the temperature of the molten metal to the furnace for appropriate control of the furnace.

A problem with the foregoing arrangement is that foreign material such as dross, solids, or semi-solids (hereinafter referred to as "particles") contained in the well can be drawn into the molten metal pump. If large particles are drawn into the pump, the pump can be jammed, causing catastrophic failure of the pump. Even if catastrophic failure does not occur, the particles can degrade the performance of the pump or negatively affect the quality of a casting made from the molten metal.

In addition to the problems posed by drawing large particles into the pump, a problem also exists with respect to drawing small particles, on the order of 100 microns or less, into the pump. Although small particles cannot cause catastrophic failure of the pump, they still can negatively affect the quality of a casting made from the molten metal. There is a need to positively filter the molten metal prior to using the molten metal in a casting process. While so-called "downstream" filters have been used to filter the molten metal prior to its introduction into a mold, the filtration burden imposed on downstream filters will be lessened if the molten metal has been fine-filtered at some upstream location. In view of the drawbacks associated with unfiltered molten metal pumps, it has become desirable to attempt to remove particles from the molten metal prior to passage of the molten metal through the pump.

One approach that has been attempted is a so-called gate filter. A gate filter is a porous barrier that is interposed between the furnace and the external well immediately upstream of the pump. In theory, a gate filter will remove particles being circulated out of the furnace, thereby avoiding ingestion of those particles into the pump. In practice, several difficulties have arisen. First, it has been found difficult to install the filter, in part because a frame must be provided for the filter at the junction between the furnace and the well. Second, the filter tends to be lifted by the molten metal, thereby permitting particles to flow into the well underneath the raised filter. Third, a thermal gradient can exist in the metal across the filter from the "hot" side to the "cold" side. The temperature of the molten metal in the well can be lower than the temperature in the furnace on the order of 50°-75° F. Because the temperature sensor for the furnace often is located in the well, the lowering of the temperature of the molten metal in the well causes the control system for the furnace to unnecessarily activate the combustion system for the furnace. In turn, excessive heat generated by the furnace causes even more particles to be formed. An additional problem is that oxides and dross formed in the pump well can be drawn into the pump.

Another approach that has been attempted is to suspend the pump within a liquid-permeable filter basket. In effect, the basket acts as a filter for the pump. A drawback of the basket approach is that it is difficult to properly position the pump relative to the basket. The basket must be rested on, or adjacent to, the floor of the well, and the pump must be properly suspended within the basket. Additionally, the basket must be relatively large in order to extend completely above the upper surface of the molten metal. Because the basket extends out of the molten metal, it must be insulated in some manner in order to minimize heat losses through the upper surface. Also, because the basket is so large, its cost is greater than desired.

One approach that has been effective is disclosed in U.S. patent application Ser. No. 309,613, filed Feb. 10, 1989, by L. H. Amra, et al., entitled "Molten Metal Pump with Filter," (hereinafter referred to as the "Pump Filter Patent"), the disclosure of which is incorporated herein by reference. In the Pump Filter Patent, a filter is attached to a base of a pump so as to surround the inlet of the pump. Preferably, the filter is made of a porous, bonded (fired or sintered), refractory substance such as silicon carbide and/or alumina. The surface area of the pump is quite large relative to the inlet area of the pump. Due to the configuration of the filter, a large cavity is created that is defined by the interior of the filter and the bottom surface of the pump.

Due to the configuration of the filter and its relationship to the pump, the filter can have a very low porosity, for example, approximately 35-38 percent. The filter not only filters coarse particles that can ruin the pump, but it also filters fine particles that can negatively affect a casting. The filter can be cleaned easily and, when cleaning no longer is feasible, it can be removed and replaced without difficulty. The compactness of the filter minimizes installation difficulties and it also minimizes the expense of the filter.

Despite the advantages of the filter arrangement disclosed in the Pump Filter Patent, certain problems have not been addressed. One of those problems relates to the strength of the filter and the integrity of the filter-pump attachment. Desirably, the filter would be as strong as possible, and it would be attached to the pump in a manner that not only would enhance the strength of the filter, but it also would provide additional support for the base of the pump. Another problem not addressed by the Pump Filter Patent is the possible removal of an impeller and supporting shaft for purposes of repair or replacement without disturbing the attachment between the filter and the pump. Desirably, the filter would be constructed such that the filter could remain attached to the pump while permitting the impeller and shaft to be removed for purposes of repair or replacement.

In view of the approaches that have been described, there remains a need for an effective technique for filtering molten metal being passed through a molten metal pump. It is hoped that any such technique would be inexpensive, easy to work with, and would avoid the drawbacks and address the noted problems of the approaches described above.

SUMMARY OF THE INVENTION

The present invention provides a new and improved technique for filtering molten metal being pumped by a molten metal pump. In one embodiment, the invention includes a filter that is attached to the base of the pump so as to surround the inlet of the pump. As in the Pump Filter Patent, the filter is made of a porous, bonded (fired or sintered), refractory substance such as silicon carbide and/or alumina. The surface area of the filter is quite large relative to the inlet area of the pump. Due to the configuration of the filter, a large cavity is created, which cavity is defined by the interior of the filter and the bottom surface of the pump.

The filter according to the invention is an improvement over the filter disclosed in the Pump Filter Patent. The filter according to the invention includes, in cross-section, an end wall having a plurality of corrugations. A plurality of tabs project from the corrugated sections disclosed closest to the pump. The tabs are in contact with the base member, and are secured there by means of a cemented connection. The corrugations not only increase the surface area of the filter for more effective filtering action, but the cemented connection between the tabs and the base member enhances the strength of the filter and the filter-base member connection.

As in the Pump Filter Patent, the filter can have a very low porosity, for example, approximately 35-38 percent. The filter not only filters coarse particles that can ruin the pump, but it also filters fine particles that can negatively affect a casting. The filter according to the invention can be cleaned easily and, when cleaning no longer is feasible, it can be removed and replaced without difficulty. The compactness of the filter minimizes installation difficulties, and it also minimizes the expense of the filter.

In an alternative embodiment of the invention, the base member includes an inlet along one side and an opening along a bottom surface through which access to the impeller may be had. In this alternative embodiment, the filter is a semi-toroidal structure defined by an outer wall, an inner wall, and an end wall connecting the outer and inner walls. The filter is connected to the base member by cemented connections made at the ends of outer and inner walls. The diameter of the inner walls is such that a portion of the bottom surface of the base member is exposed, which exposed portion includes the opening through which access may be had to the impeller. The filter not only surrounds the pump's inlet as in the first-described embodiment, but it also enables the impeller and its associated shaft to be removed from the bottom of the base member without disturbing the filter-base member connection. Accordingly, the filter provides effective filtering action as in the first-described embodiment, and it also permits the impeller and its associated shaft to be removed conveniently from the pump for purposes of repair or replacement.

The foregoing and other features and advantages of the invention are illustrated in the accompanying drawings and are described in more detail in the specification and claims that follow.

DESCRIPTION OF THE PREFERRED EMBODIMENT

Figure 1:
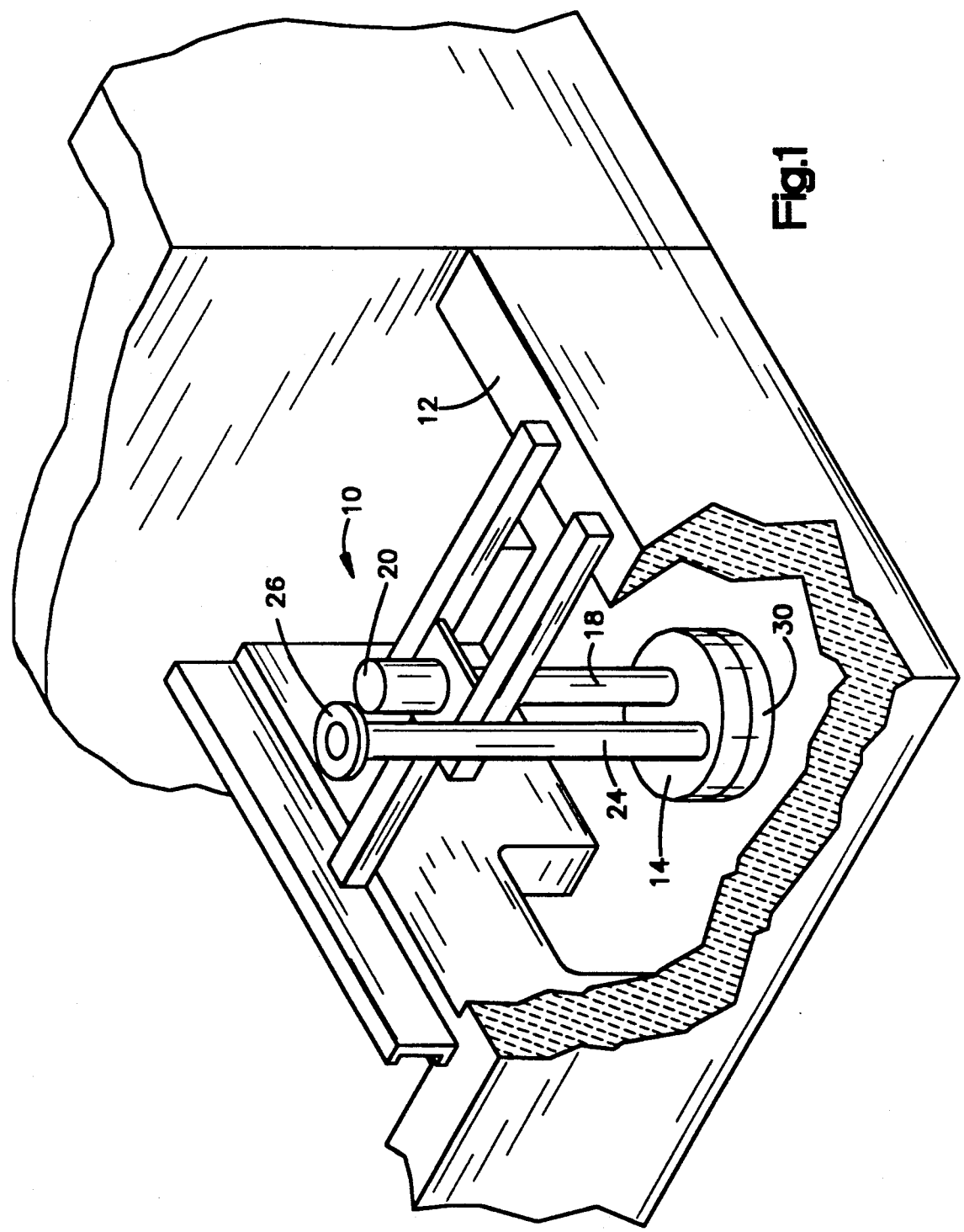
FIG. 1 is a schematic, perspective view of the external well of a reverberatory furnace into which a molten metal pump has been immersed.
Figure 2:
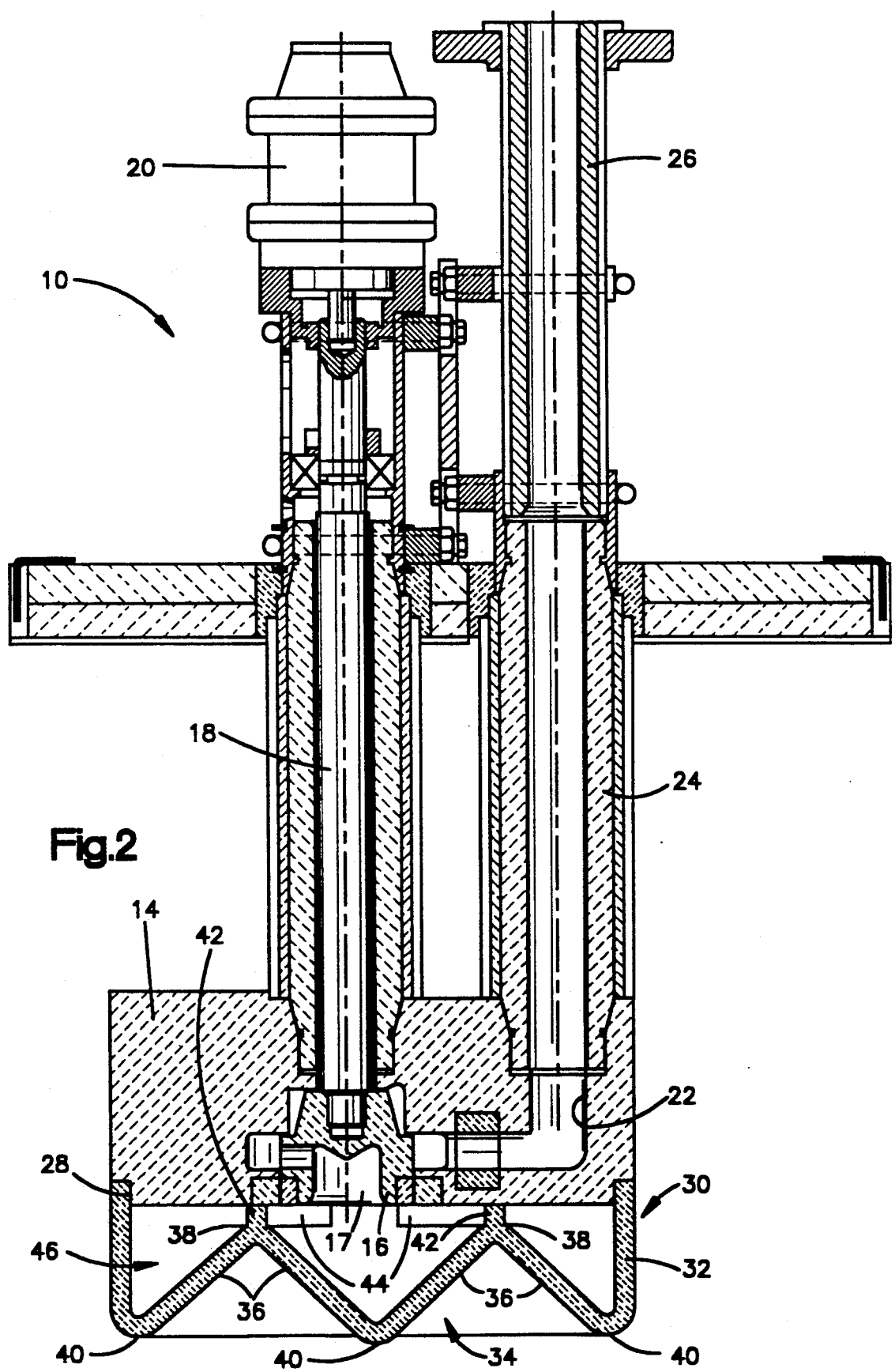
FIG. 2 is a cross-sectional view of the pump of FIG. 1.

Referring to FIGS. 1 and 2, a molten metal pump according to the invention is indicated generally by the reference numeral 10. The pump 10 is adapted to be immersed in molten metal contained within a vessel 12. The vessel 12 can be any container containing molten metal, although the vessel 12 as illustrated is the external well of a reverberatory furnace.

It is to be understood that the pump 10 can be any type of pump suitable for pumping molten metal. Generally, however, the pump 10 will have a base member 14 within which an impeller 16 is disposed. The impeller 16 includes an opening 17 along its bottom surface that defines a fluid inlet for the pump 10. The impeller 16 is supported for rotation within the base member 14 by means of an elongate, rotatable shaft 18. The upper end of the shaft 18 is connected to a motor 20. The motor 20 can be of any desired type, although an air motor is illustrated.

The base member 14 includes an outlet passageway 22. A riser 24 is connected to the base member 14 in fluid communication with the passageway 22. A flanged pipe 26 is connected to the upper end of the riser 24 for discharging molten metal into a spout or other conduit (not shown). The pump 10 thus described is a so-called transfer pump, that is, it transfers molten metal from the vessel 12 to a location outside of the vessel 12. As indicated earlier, however, the pump 10 is described for illustrative purposes and it is to be understood that the pump 10 can be of any type suitable for the pumping of molten metal.

The base member 14 includes a shoulder portion 28 about its lower periphery. The shoulder portion 28 circumscribes the fluid inlet 17 defined by the impeller 16. The base member 14 is circular in plan view and, thus, the shoulder portion 28 is circular. If the base member 14 were to be of a non-circular cross-section, then the shoulder portion 28 should conform to the shape of the base member 14.

A generally cylindrical, cup-like filter 30 is connected to the base member 14 so as to completely surround the fluid inlet 17. The filter 30 includes a cylindrical side wall 32 and a corrugated end wall 34. In cross-section, the end wall 34 is defined by alternating straight portions 36 having rounded ridges 38 and rounded troughs 40. Tabs 42 project from the ridges 38 and contact the bottom surface of the base member 14. The tabs 42 are spaced so as to define openings 44 therebetween. The openings 44 permit filtered molten metal to be drawn into the fluid inlet 17. The side wall 32 is adapted to mate tightly with the shoulder portion 28, and to be secured there by means of refractory cement such as that sold under the trademark FRAXSET by Metaullics Systems of Solon, Ohio. FRAXSET refractory cement has exceptional strength and resistance to corrosion in molten aluminum and zinc applications. Similarly, the tabs 42 are attached to the base member 14 by means of FRAXSET refractory cement.

It is expected that the filter 30 will be a porous structure formed of bonded or sintered particles such as 6-grit silicon carbide or alumina. A suitable filter made of 6-grit silicon carbide or alumina is commercially available from Metaullics Systems of Solon, Ohio. The filter 30, when manufactured of 6-grit silicon carbide or alumina, has a porosity of approximately 35-38 percent. Other grit sizes may be employed for finer or coarser filtration as may be desired, it being recognized that changing the grit size will affect the flow rate of the filter 30. The filter 30 is refractory due to the material from which it is made, and thus it will withstand the temperatures encountered in the processing of molten, non-ferrous metals.

The size of the filter 30 will depend upon the pumping capabilities of the pump 10. As illustrated, the side wall 32 is approximately 7.0 inches high and has an outer diameter of approximately 14.125 inches. The side wall 32 projects approximately 6.0 inches beyond the lowermost portion of the base member 14 (the distance from the bottom of the base member 14 to the bottom of the troughs 40). The filter 30 has a uniform wall thickness of approximately 1.0 inch. For the dimensions given, the filter 30 has an external surface area of about 525.5 square inches.

The filter 30 defines a portion of a cavity 46, which cavity 46 is bounded by the interior surface of the side wall 32, the interior surface of the end wall 34, and the bottom surface of the base member 14. The inlet area of the pump is approximately 4.75 square inches (as measured by the internal diameter of the impeller 16). Accordingly, the ratio of the exterior surface area of the filter 30 to the area of the pump inlet is approximately 110.63.

Using the exterior surface area of the filter 30 as a reference, and assuming that the molten metal being pumped has a 12-inch head, and further assuming a flow capacity of 240 pounds per minute per square foot per inch-head, the theoretical flow rate of the filter 30 is approximately 10,510 pounds per minute. In practice, the pump 10 has a flow rate with a 12-inch head of approximately 750 pounds per minute. Accordingly, the filter 30 provides a safety factor of approximately 14 to 1 in operating flow rate capability.

AN ALTERNATIVE EMBODIMENT

Figure 3:
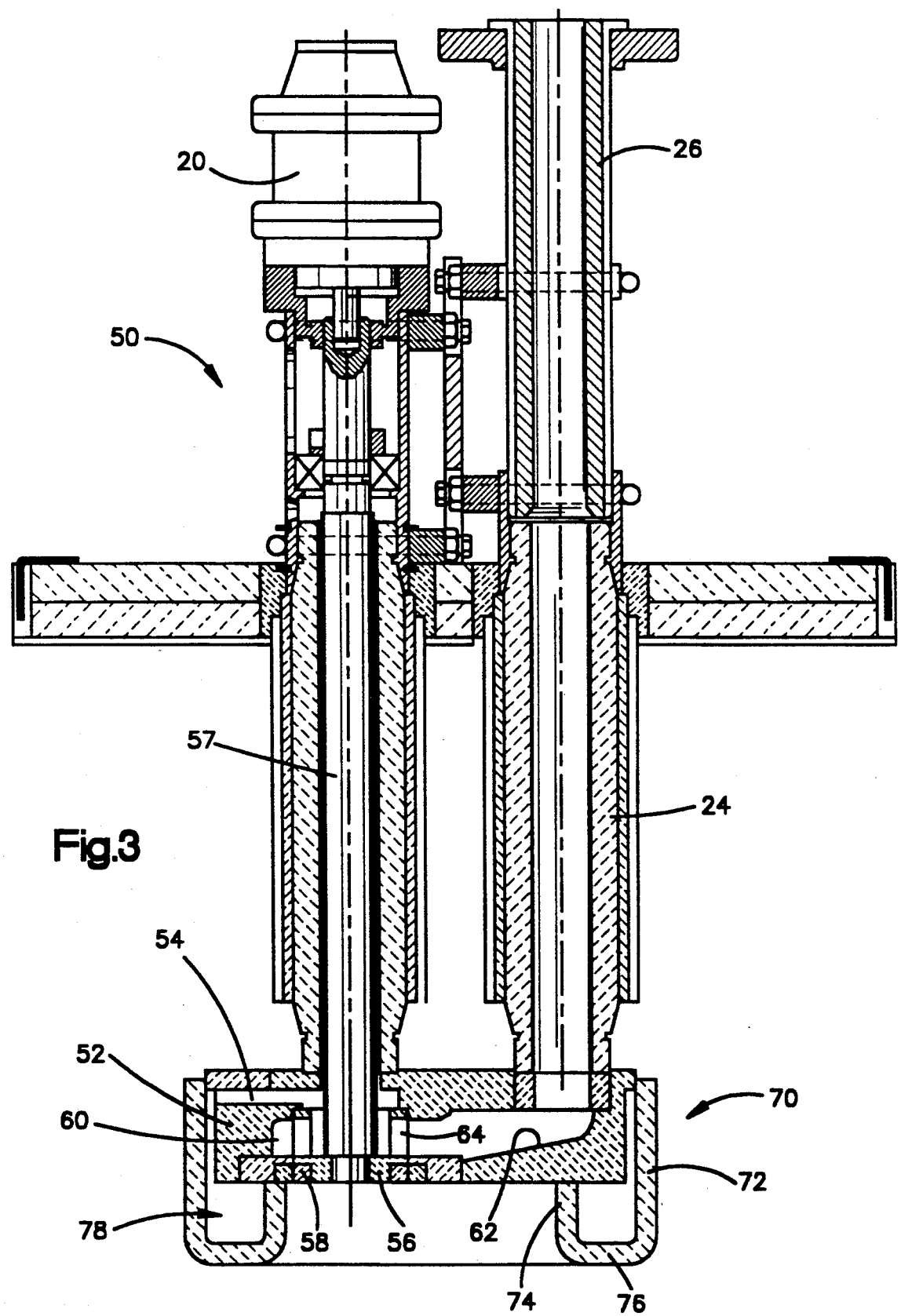
FIG. 3 is a cross-sectional view of an alternative embodiment of the pump of FIG. 1.
Figure 4:
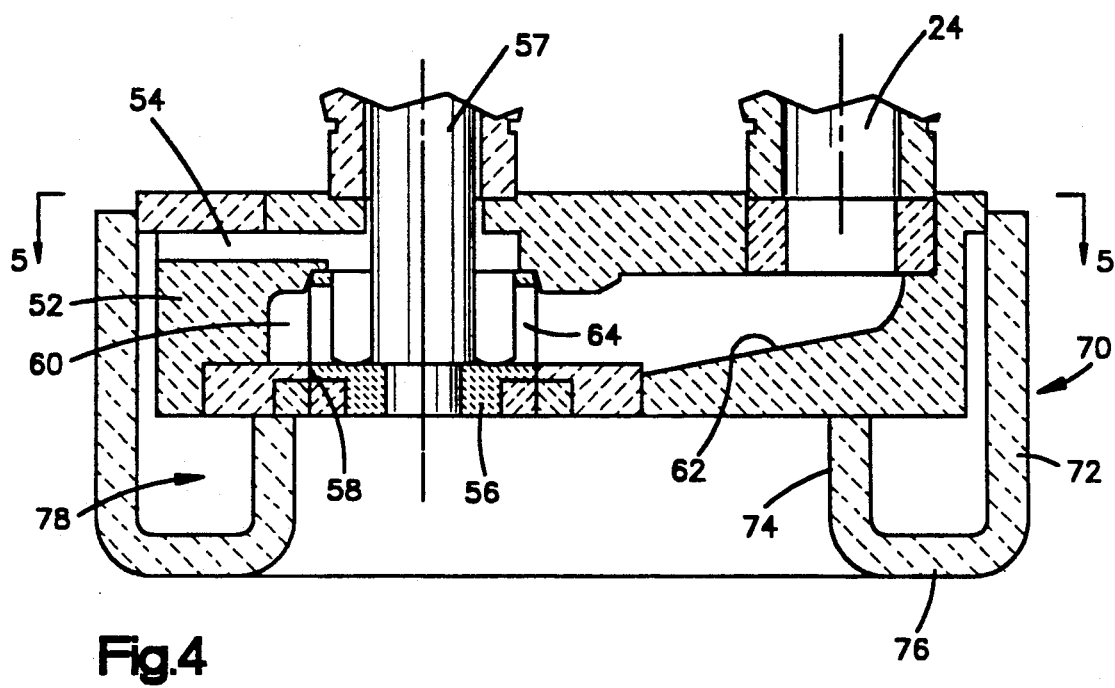
FIG. 4 is an enlarged cross-sectional view of the lower portion of the pump of FIG. 3.
Figure 5:
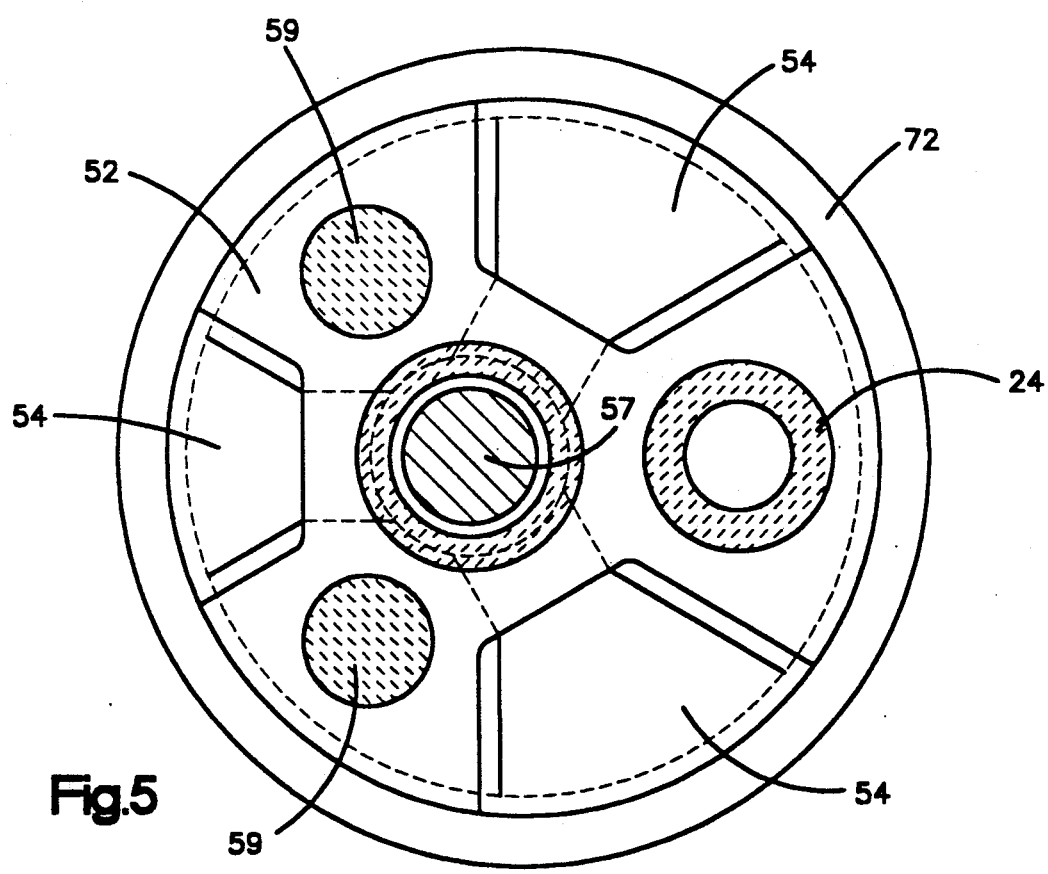
FIG. 5 is an enlarged cross-sectional view of the pump of FIG. 3 taken along a plane indicated by line 5—5 in FIG. 4.

Referring to FIGS. 3-5, another molten metal pump according to the invention is indicated generally by the reference numeral 50. The pump 50 is quite similar to the pump 10, and is intended to be used for the same purposes and under the same conditions. Where appropriate, the same reference numerals will be carried over from FIGS. 1 and 2 to FIGS. 3-5 in order to indicate components that are identical, or substantially identical.

The pump 50 includes a base member 52 that is configured differently than the base member 14. In particular, the base member 52 includes three laterally extending openings 54 that define fluid inlets for the pump 50. The openings 54 are located near the upper portion of the base member 52. An impeller 56 is disposed within the base member 52 and is supported for rotation therein by an impeller shaft 57. The base member 52 includes an opening 58 in its lower surface that closely matches the outer diameter of the impeller 56. A pair of optional refractory posts 59 (FIG. 5) provide support for the base member 52. The posts 59 are used with certain molten metal pumps but not with others, depending upon the design of the pump, as is known to those skilled in the art.

A pumping chamber 60 is included as part of the base member 52. The impeller 56 is disposed within the pumping chamber 60. An outlet passageway 62 is in fluid communication with the pumping chamber 60 and discharges pumped molten metal to the riser 24 and the flanged pipe 26. The impeller 56 includes a plurality of openings 64 that provide fluid communication between the openings 54 and the pumping chamber 60. Upon rotation of the impeller 56, fluid will be drawn through the openings 54, into the impeller 56, and thereafter will be pumped out of the pumping chamber 60 through the outlet passageway 62.

A semi-toroidal filter 70 is connected to the base member 52 so as to completely surround the fluid inlet 54. The filter 70 includes a cylindrical outer side wall 72, a cylindrical inner side wall 74, and an annular end wall 76 that closes the side walls 72, 74. The filter 70 defines a portion of a cavity 78, which cavity 78 is bounded by the interior surfaces of the side walls 72, 74, the end wall 76, and the bottom and side surfaces of the base member 52.

As with the filter 30, the size of the filter 70 will depend upon the pumping capabilities of the pump 50. As illustrated, the side wall 72 is approximately 9.0 inches high and has an outer diameter of approximately 19.0 inches. The inner side wall 74 is approximately 4.0 inches high and has an inner diameter of approximately 9.0 inches. Accordingly, the outer surface of the side wall 72 has a radius approximately 5.0 inches greater than the radius of the outer surface of the side wall 74. As with the filter 30, the filter 70 has a uniform wall thickness of approximately 1.0 inch.

For the dimensions given, the filter 70 has an external surface area of about 840 square inches. The inlet area of the pump is approximately 6.95 square inches (as measured by the smallest area of the inlet openings 54). Accordingly, the ratio of the exterior surface area of the filter 70 to the area of the inlet openings 54 is approximately 120.9.

Using the external surface area of the filter 70 as a reference, and assuming that the molten metal being pumped has a 12-inch head, and further assuming a flow capacity of 240 pounds per minute per square foot per inch head, the theoretical flow rate of the filter 70 is approximately 1,680 pounds per minute. In practice, the pump 50 with a 12-inch head has a flow rate of approximately 3,000 pounds per minute. Accordingly, the filter 70 provides a safety factor of approximately 5.6 to 1 in operating flow rate capability.

As with the filter 30, the filter 70 is tightly fitted to the side of the base member 52 and is secured there by means of FRAXSET refractory cement. It is expected that the filter 70 will be constructed of the same material of the filter 30 and, therefore, the specifications provided earlier for the filter 30 apply equally to the filter 70.

The present invention provides significant advantages compared with gate filters or basket filters. Because the filter 30 is integral with the base member 14, the pump 10 can be positioned as desired without concern for maintaining a proper relationship between the base member 14 and the filter 30. The position of the filter 30 relative to the vessel 12 can be adjusted simply by raising or lowering the pump 10. It is expected that the end wall 34 will be positioned approximately two or three inches from the bottom of the vessel 12, although any desired spacing can be chosen. The corrugated end wall 34 not only provides more surface area than the filter disclosed in the Pump Filter Patent, but it also is stronger due to (a) the inherent strength arising from a corrugated end wall configuration, and (b) the support provided by the tab-base member connection.

Because the filter 30 is completely immersed within the molten metal, it does not conduct heat out of the bath as is the case with a gate filter or a basket filter. Thermal gradients often associated with gate filters are eliminated because the filter is integral with the pump and a fully open passageway is maintained between the furnace and the external well. Further, the characteristics of the filter 30 not only enable exceedingly fine as well as coarse particles to be filtered, but the permeability of the filter is such that the pump's flow capability can be maintained. Due to the particular configuration of the filter 30 and due to the material from which it is made, the filter 30 can be cleaned easily and, when replacement is necessary, the cost to the user will be less than with a gate filter or a basket filter.

In the particular case of the filter 70, the central opening defined by the inner side wall 74 enables the impeller 56 and the shaft 57 to be removed as a unit upon disconnecting the upper end of the shaft 57 from the drive motor 20. The shaft 57 and the impeller 56 can be removed from the bottom of the base member 52 through the opening 58 without disturbing the attachment between the base member 52 and the filter 70. This feature represents an advantage compared with the filter 30, because it is necessary to remove the filter 30 in order to provide access to the impeller 16 for purposes of inspection or replacement. While the filter 30 is relatively inexpensive and easy to remove and replace, nevertheless it can be an advantage under certain circumstances to be able to remove the impeller 56 and the shaft 57 without disturbing the connection between the base member 52 and the filter 70.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A molten metal pump, comprising:

a base member, the base member having a fluid inlet along one side and an opening in a bottom surface;

an impeller disposed for rotation within the base member, the impeller being in fluid communication with the fluid inlet and being removable from the base member through the opening in the bottom surface of the base member; and a filter secured to the base member and defining a portion of a cavity therebetween, the filter completing surrounding the fluid inlet and the opening in the bottom surface of the base member such that the impeller can be removed from the base member while the filter is attached to the base member in said molten metal pump.

2. The pump of claim 1, wherein the filter is made from bonded or sintered refractory material.

3. The pump of claim 1, wherein the filter material is 6-grit silicon carbide.

4. The pump of claim 1, wherein the filter has a porosity within the range of about 35-38 percent.

5. The pump of claim 1, wherein the ratio of the external surface area of the filter to the area of the fluid inlet is approximately 120.9.

6. The pump of claim 1, the filter is a semi-toroidal structure having an outer side wall, an inner side wall, and an end wall that closes the outer side wall and the inner side wall.

7. The pump of claim 6, wherein the filter is attached to the base member by cemented connections at the ends of the outer wall and the inner wall opposite the end wall.

8. The pump of claim 1, wherein the filter is made from bonded refractory material.

9. The pump of claim 1, wherein the filter material is alumina.

10. A filter for a molten metal pump having a base member, the base member having a fluid inlet along one side and an opening in a bottom surface, comprising:

a porous, refractory member adapted to be secured to the base member so as to define a cavity therebetween, the member in use completing surrounding the fluid inlet and the opening in the bottom surface of the base member in said molten metal pump.

11. The filter of claim 10, wherein the m ember has a uniform wall thickness.

12. The filter of claim 10, wherein the member is made from 6-grit silicon carbide.

13. The filter of claim 10, wherein the member has a porosity within the range of about 35-38 percent.

14. The filter of claim 10, wherein the member is a semi-toroidal structure having an outer side wall, an inner side wall, and an end wall that closes the outer side wall and the inner side wall.

15. The filter of claim 10, wherein the member is made from alumina.

* * * * *

UNITED STATES PATENT AND TRADEMARK OFFICE
CERTIFICATE OF CORRECTION

PATENT NO. : 5,078,572

DATED : January 7, 1992

INVENTOR(S) : Arma et al.

It is certified that error appears in the above-identified patent and that said Letters Patent is hereby corrected as shown below:

Column 8, line 16 - delete "bonded or".

Signed and Sealed this

Sixth Day of July, 1993

Attest:

MICHAEL K. KIRK

*Attesting Officer*  Acting Commissioner of Patents and Trademarks